United States Patent [19]

Okapuu et al.

[11] Patent Number: 4,466,772
[45] Date of Patent: Aug. 21, 1984

[54] CIRCUMFERENTIALLY GROOVED SHROUD LINER

[76] Inventors: Ülo Okapuu, 309 Place Valencay, St. Lambert, Quebec, Canada, J4S 1S3; Kiritkumar V. Patel, 4176 Trellis Crescent, Mississauga, Ontari, Canada, L5L 2M2

[21] Appl. No.: 228,889

[22] Filed: Jan. 27, 1981

Related U.S. Application Data

[63] Continuation-in-part of Ser. No. 968,429, Dec. 11, 1978, abandoned, which is a continuation-in-part of Ser. No. 924,371, Jul. 13, 1978, abandoned.

[30] Foreign Application Priority Data

Jul. 14, 1977 [GB] United Kingdom ............... 29653/77
Oct. 12, 1978 [GB] United Kingdom ............... 40287/78

[51] Int. Cl.³ .................. F01D 11/08; F01D 5/20
[52] U.S. Cl. ..................... 415/172 A; 415/170 R
[58] Field of Search ............... 415/172 A, 172 R, 174

[56] References Cited

U.S. PATENT DOCUMENTS

| | | |
|---|---|---|
| 1,651,855 | 6/1924 | Warren ........................... 415/172 A |
| 1,708,044 | 9/1924 | Baumann ........................ 415/172 A |
| 3,843,278 | 10/1974 | Torell . |
| 3,854,842 | 12/1974 | Caudill ............................ 415/174 X |
| 3,867,061 | 2/1975 | Moskowitz . |
| 4,055,041 | 10/1977 | Adamson et al. . |
| 4,239,452 | 12/1980 | Roberts ........................... 415/172 A |

FOREIGN PATENT DOCUMENTS

| | | |
|---|---|---|
| 289997 | 5/1929 | Canada . |
| 580855 | 8/1959 | Canada . |
| 620723 | 5/1961 | Canada . |
| 724942 | 1/1966 | Canada . |
| 848,829 | 8/1970 | Canada . |
| 911892 | 8/1972 | Canada . |
| 928636 | 6/1973 | Canada . |
| 1503636 | 3/1969 | Fed. Rep. of Germany . |
| 511278 | 8/1939 | United Kingdom . |
| 793886 | 4/1958 | United Kingdom . |
| 839915 | 6/1960 | United Kingdom . |
| 851323 | 10/1960 | United Kingdom . |
| 1298643 | 12/1972 | United Kingdom . |

OTHER PUBLICATIONS

Aircraft Propulsion-NASA SP-259-NASA Lewis Research Center, Cleveland, Ohio, Nov. 18-19, 1970, Scientific & Technical Information Office, 1971.

Primary Examiner—Harvey C. Hornsby
Assistant Examiner—Shewen Bian

[57] ABSTRACT

A turbine is provided with a stationary shroud surrounding a rotor provided with a plurality of radially extending blades. The stationary shroud includes a plurality of spaced-apart lands defining therebetween openings to deflect the flow leakage from the high pressure side of each blade to the low pressure side of the respective blade.

11 Claims, 11 Drawing Figures

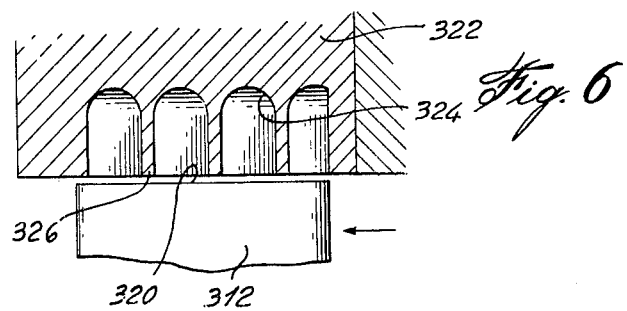
Fig. 6
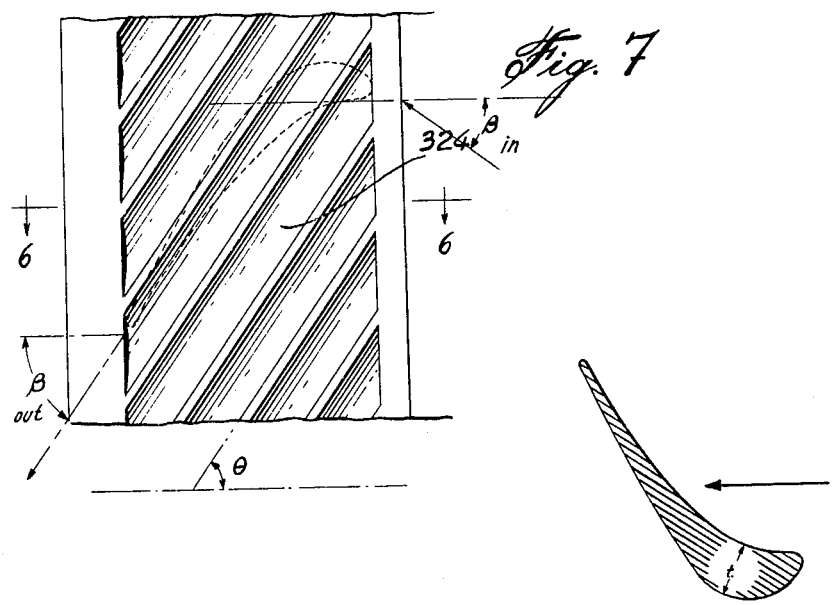
Fig. 7
Fig. 9
Fig. 8
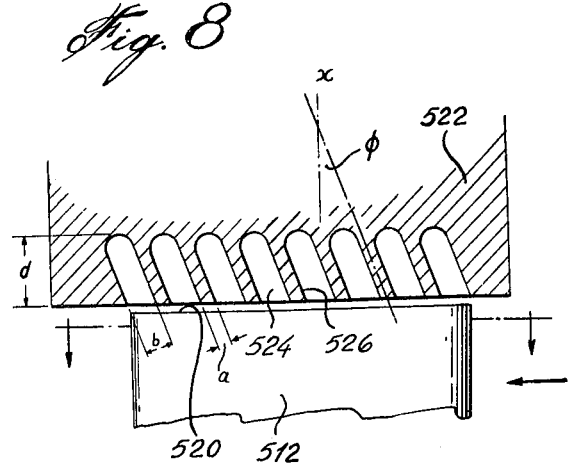

CIRCUMFERENTIALLY GROOVED SHROUD LINER

CROSS-REFERENCE TO RELATED APPLICATIONS

This application is a continuation-in-part of U.S. application, Ser. No. 968,429, filed Dec. 11, 1978, which is a continuation-in-part of U.S. application, Ser. No. 924,371, filed July 13, 1978, both abandoned in favor of the present application.

BACKGROUND OF THE INVENTION

1. Field of the Invention

The present invention relates to turbines, and more particularly, to gas or steam turbines.

2. Description of the Prior Art

Rotor blades in a turbine, especially in smaller turbines, are normally unshrouded. The root of the blade is fixed to a hub, but the outer radial end or tip of the turbine rotor blade is free. A liner of cylindrical shape is normally provided in the stationary housing acting as a shroud for the blades. However, since the shroud liner is stationary, it is necessary to leave a gap or tolerance between the tip of the blade and the shroud liner so as to avoid rubbing. It is necessary to provide a sufficient gap between the tip and the shroud in order to provide for the differences in the expansion of the respective metal components. A minimum practical clearance has been found to be 1% of the blade height. However, when such gaps are provided, the gases on the high pressure side of the blade tend to leak over the tip of the blade at a relatively higher velocity than the rotating velocity of the blade to thereby interfere with the low pressure side of the blade and deteriorate the flow pattern of the gases on the low pressure side increasing, for instance, separation of the gas flow from the surface of the blade on the low pressure side thereof. Furthermore, the gap causes some of the gas to bypass the rotor, and thus not contribute to the work, since it is not turning relative to the rotor blades.

Various improvements and developments have been made to reduce the actual gap between the tip of the blade and the shroud liner as, for example, the ablative seal described in U.S. Pat. No. 3,836,156, issued Sept. 17, 1974, Hector B. Dunthorne, and assigned to the applicant. This helps to reduce the size of the gap, but does not eliminate the tip leakage. One common method for reducing the amount of tip leakage flow, as well as its disruptive influence on the flow on blade low pressure surface, is to equip the rotor tip with a shroud.

Each blade has at its tip a segment of a ring, such that when assembled in a rotor disc, these shroud segments form a continuous ring which prevents flow from within rotor blade passages from leaking around the blade tips. Due to the necessary tip clearance, some flow will still leak past the rotor blades, but at least it does not disrupt the mainstream flow on blade low pressure surfaces.

However, any such shroud causes a relatively large amount of metal to be added to rotor blade tips. This is most undesirable in the case of first stage turbine blades, because of the high gas temperature at the exit of the combustion chamber immediately preceding the turbine. The additional mass of the blade created at the tip causes the centrifugal stresses in the rotor blades to be substantially increased, with the result of a much reduced rotor blade life; while there are ways to alleviate this problem, such as a reduced gas temperature, or blade roots with very large metal areas, hence thick discs, considerations of overall engine efficiency and weight usually dictate the elimination of such shrouds on first stage blades.

SUMMARY OF THE INVENTION

It is an aim of the present invention to provide a mechanical means of aerodynamically controlling and reducing the leakage of the gases from the high pressure side of the blade to the low pressure side of the blade over the tip thereof without using shrouds at the blade tips.

A construction in accordance with the present invention includes a stationary shroud surrounding a rotor provided with a plurality of radially extending blades, the stationary shroud including a plurality of spaced-apart lands, the thickness of each land and the spacing therebetween and the depth of the openings so formed being selected so as to redirect the flow leakage.

BRIEF DESCRIPTION OF THE DRAWINGS

Having thus generally described the nature of the invention, reference will now be made to the accompanying drawings, showing by way of illustration, a preferred embodiment thereof, and in which:

FIG. 6 is a radial fragmentary cross-section taken along line 6—6 of FIG. 7, similar to FIG. 2, showing still yet another embodiment thereof;

FIG. 7 is a plan view looking outwardly radially at the shroud of FIG. 6;

FIG. 8 is a fragmentary radial cross-section similar to FIG. 2 but showing yet another embodiment; and FIG. 9 is a schematic cross-section of a turbine blade of the present invention.

FIG. 11 is a graph of the turbine difference in efficiency $\Delta\eta$ against the inclination angle of the

DESCRIPTION OF THE PREFERRED EMBODIMENTS

Figure 1:
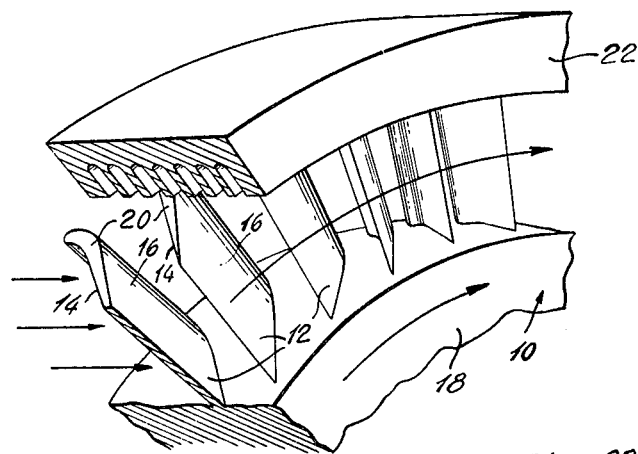
FIG. 1 is a fragmentary perspective view of a turbine wheel with a stationary shroud associated therewith.

Referring now to the drawings, there is shown a turbine wheel 10 with a plurality of blades 12 each having a high pressure or concave side 14 and a low pressure or convex side 16. Each of the blades is fixed to a hub 18. Each blade has a free end referred to as tip 20. A cylindrical housing surrounding the rotor includes a cylindrical stationary shroud 22. The shroud 22 is spaced from the tips 20 of the blades 16 by the gap "x". This distance "x" represents the necessary clearance to allow for differences in expansion of the respective metals.

The shroud, in the present embodiment, is provided with a plurality of parallel grooves 24 having a bight 28 and by thin lands 26. In a typical example of a turbine which was tested, the parameters were as follows:

| | |
|---|---|
| Blade chord length | .540" |
| Thickness of blade trailing edge | .018" |

-continued

| | |
|---|---|
| Gap "x" | .014" to .020" |
| Depth of groove 24 | .150" |
| Width of groove | .050" |
| Thickness of land 26 | .020" |
| Mean angle of blade to axis of rotor | 45.3° |

The groove parameters would, as a function, be determined by the size and shape of the blades as well as the gap "x".

It has been found that, in addition to the advantages mentioned above, there is the added advantage that there is less rub area for the blade tips and the geometry of the shroud is better suited for blade containment in the case of accidental dislodgement of the blades.

Figure 2:
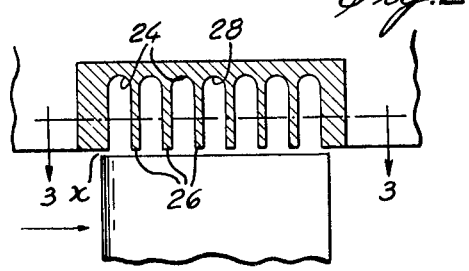
FIG. 2 is a fragmentary radial cross-section showing the shroud and a tip of a typical blade.
Figure 3:
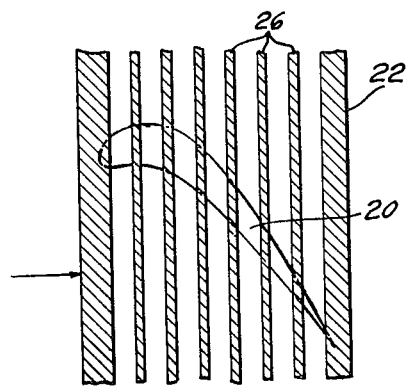
FIG. 3 is a fragmentary cross-section taken along line 3—3 of FIG. 2.

In the embodiment shown in FIGS. 1, 2 and 3, the bight 28 of the groove 24 is semi-circular in cross-section, and the grooves 24 run circumferentially in planes at right angles to the axis of the turbine.

Figure 4:
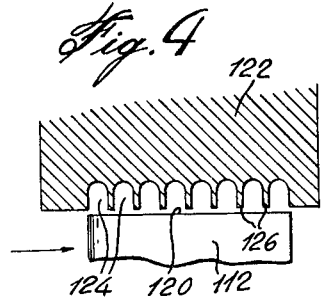
FIG. 4 is a fragmentary radial cross-section similar to FIG. 2 but showing another embodiment of the shroud.

In the embodiment shown in FIG. 4, a fragmentary blade 112 having a tip 120, and fixed shroud 122 are illustrated the grooves 124 formed by lands 126 are shallower than those shown in FIGS. 1 and 2, and in this case, the depth of the groove was measured at between 0.100" and 0.050". The structure of the grooved shroud is the same as in the embodiment described with respect to FIG. 2.

It has further been discovered that the depth of the groove in the shroud should not be too deep as it will affect the efficiency of the engine in a detrimental manner. It has been discovered through tests that there appears to be a relationship between the thickness of the blade tip taken at t in FIG. 9 or the widest part of the blade at the tip thereof and the depth of the groove. It would appear that the efficiency of the engine will be increased if the ratio of the thickness of the blade to the depth of the groove in the shroud is greater than 1. In other words, $t/d > 1$. Table A attached at the end of the specification shows graphically this phenomenon. It is conceivable that in the case of very thin blade tips, small caps or mini-shrouds could be provided at the tip thereof in order to effectively widen the tip of the blade. The following results were taken from actual tests, and the efficiency is measured against a turbine having a shroud without grooves but with the remaining characteristics the same.

| | Blade Tip Thickness | Shroud Groove Depth | Shroud Groove Width | t/w | t/d | η | Δη |
|---|---|---|---|---|---|---|---|
| Example I | .171 | .150 | .050 | 3.42 | 1.14 | 90.9 | .1 |
| Example II | .073 | .150 | .050 | 1.46 | .49 | 90.2 | −.4 |
| Example III | .073 | .060 | .050 | 1.46 | 1.22 | 90.7 | .1 | t = thickness
w = width
d = depth
η = efficiency
Δη = difference in efficiency

The tests shown above, it is noted, were taken with a groove width being constant, that is, at 0.050 inches in width.

Figure 5:
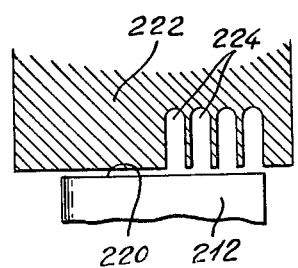
FIG. 5 is a radial fragmentary cross-section similar to FIG. 2 but showing yet another embodiment thereof.
Figure 10:
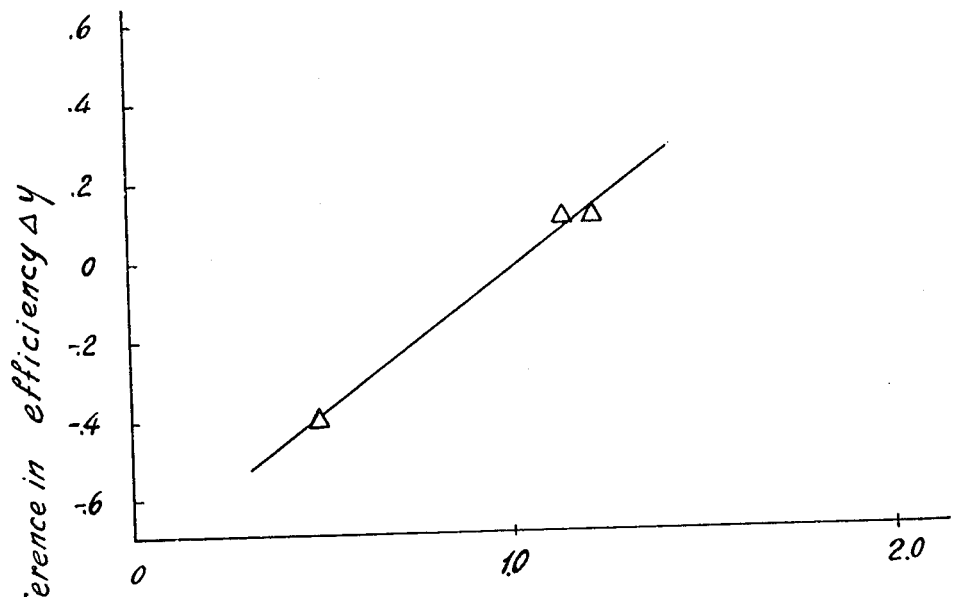
FIG. 10 is a graph of the turbine difference in efficiency $\Delta\eta$ against $\frac{t}{s}$.
Figure 11:
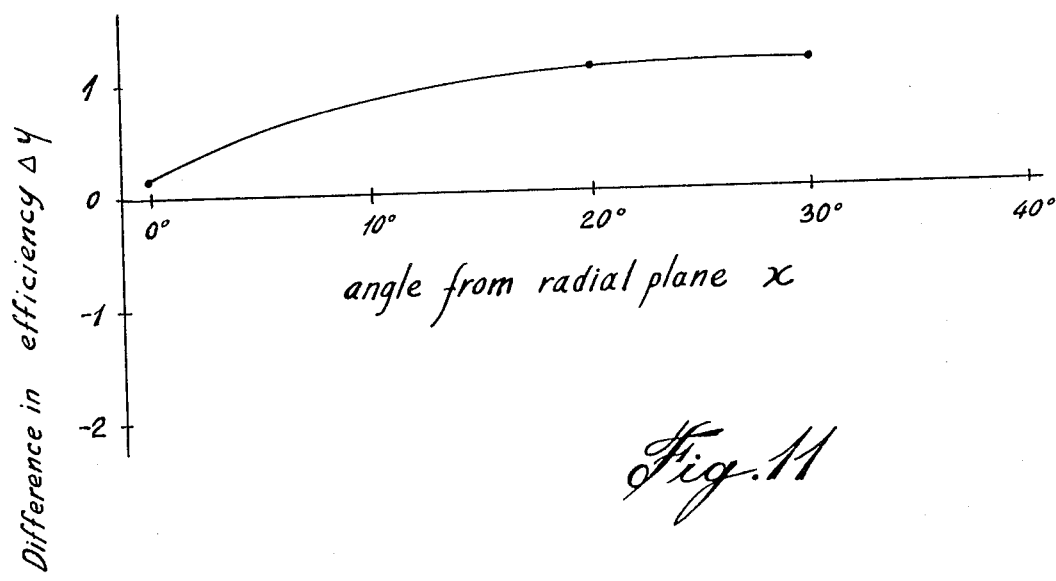

In both embodiments, the axial extent which the grooves cover is equal to the blade chord length, that is, 0.540". FIG. 5 illustrates an embodiment where the shroud is referred to at 222 while the blade 212 includes a blade tip 220, with grooves 224 in the shroud 222. The grooves 224, however, extend over only a fraction of the axial chord length of the tip 220 in the shroud 222. The values with respect to the depth of the grooves, thickness of land, etc., are the same as with the embodiment shown in FIG. 2. Of course, the overall axial coverage of the grooves is now a fraction of the normal value with the other embodiments.

It has been found that with turbine rotor blades, separation of flow from the low pressure surface is generally present, near the tip of the blade. This separation is caused by the flow leakage over the blade tip, as discussed. Tip sections of different turbine blade design have different surface pressure distribution, and thus different positions of flow separation when tip leakage flow is present. Since the grooves redirect and retard the tip leakage flow, the optimum location (and direction, for that matter) of the grooves is likely to differ from one blade design to the next. For example, in the case of a blade tip having a large negative pressure gradient near its trailing edge, grooves are placed over the trailing edge portion of the blade, to delay separation, as shown in FIG. 5. In the case of a blade having a negative pressure gradient near its leading edge, the optimum placement of grooves would be over the forward portion of the blade.

Reference will now be made to FIGS. 6 and 7 showing the groove at angles to the radial plane taken through the turbine. Referring to FIGS. 6 and 7, there is shown a shroud 322 with grooves 324. A blade 312 with a tip 320 is shown. The values are similar to the embodiment shown in FIG. 2 with the exception that the lands are 0.030" in width while the groove widths are between 0.080" and 0.140". These dimensions are taken at right angles to the lands as opposed to the axial direction. The angle θ, that is, the angle of the grooves, could be determined by computing: 90° less the inlet flow angle. In other words, the setting of angle θ would be the complementary angle to the mean inlet flow angle, that is, the angle of inlet flow measured relative to the rotating blades.

In the embodiment shown in FIG. 8, there are grooves 524 at an angle to the radial plane, and this angle φ can be between 0° to 40° from the radial plane x'. The other dimensions can be similar to the other data with respect to the previously mentioned embodiments. The angle of inclined grooves 524 or lands 526 provides a further control of the flow in the grooves, that is, a changed flow co-efficient.

Table B which follows this specification shows the increase in efficiency of the turbine as the angle of inclination from the radial plane x' increases in a direction upstream of the flow. In specific tests, referring to FIG. 8 and Table B:

a = 0.020"
b = 0.050"
d = 0.150"
φ = 20° to 30°

As can be seen from Table B, the preferred angles of inclination are between 20° and 30° although improved results were obtained with angles of inclination from 10° to 40°. These comparisons are made with an ungrooved shroud.

By way of explaining the aerodynamics, reference will be made to FIGS. 1 and 3. Next to the stationary shroud 22, the primary stream of hot gas forms a boundary layer. The moving blades 12 continuously cut into this slower moving boundary layer, which has the effect of opposing the tip leakage flow, in effect forming a partial aerodynamic seal. This phenomenon occurs on all unshrouded blades.

The grooves formed by lands 26 have the effect of thickening this boundary layer, improving the effectiveness of this "seal" (by virtue of the larger surface area scrubbed by the gas in the tip region), and by directing this boundary layer more exactly in the direction of the prevailing tip leakage.

This direction, however, will not be the same for all possible turbine rotor blades, but will depend on the inlet and exit angles $\beta$ of the blade.

Many variations of the grooves can be obtained as can be seen from the few embodiments described above.

We claim:

1. A gas turbine engine having a rotor provided with a plurality of radially extending blades and a stationary shroud surrounding the rotor, each blade having a high pressure side and a low pressure side relative to the fluid flow and a substantially smooth tip end surface, the stationary shroud comprising in its radially inward facing surface, a plurality of spaced-apart lands providing parallel grooves in the surface formed so as to reduce leakage of working fluid from the high pressure side to the lower pressure side of the rotor, said parallel grooves being inclined relative to a radial plane towards the fluid flow at an angle between 10° and 40°, the thickness of each land, the spacing between the lands and the depth of the groove being selected as a function of the flow characteristics of the turbine, and wherein $t/d > 1$ where t is the width dimension of the widest part of the blade and d is the depth of the grooves.

2. A turbine engine as claimed in claim 1, wherein the angle of inclination is between 20° and 30°.

3. An apparatus as defined in claim 1, wherein the stationary shroud surrounds a turbine rotor and the shroud includes a plurality of circumferentially extending grooves.

4. An apparatus as defined in claim 1, wherein the grooves in the shroud have a depth equal to the chord length of the blade.

5. An apparatus as defined in claim 1, wherein the grooves in the shroud have a depth covering a fraction of the chord length of the blade.

6. An apparatus as defined in claim 1, wherein the lands define grooves extending parallel and at an angle to the axis of the rotor which is other than 90°.

7. A turbine engine as claimed in claim 2, wherein the grooves have a depth from 0.050 inch (1.27 mm) to 0.150 inch (3.81 mm).

8. A turbine engine as claimed in claim 2 or claim 3, wherein there are not less than four grooves distributed over the chord length of the tip.

9. An apparatus as defined in claim 7, wherein the grooves extend over the area of the leading edge of the blade.

10. An apparatus as defined in claim 7, wherein the grooves extend over the trailing edge of the blade.

11. An apparatus as defined in claim 10, wherein the angle of the grooves is defined by 90° less the inlet flow angle.

* * * * *